United States Patent [19]
Torr

[11] 3,873,750

[45] Mar. 25, 1975

[54] METHOD OF PREPARING A HOMOGENIZES FOOD PRODUCT USEFUL AS A PROTEIN SUPPLEMENT

[76] Inventor: David Torr, 3110 Hebard Ave., Las Vegas, Nev. 89109

[22] Filed: Nov. 14, 1973

[21] Appl. No.: 415,758

[52] U.S. Cl. .................. 426/518, 426/149, 426/370
[51] Int. Cl. .............................................. A23l 1/34
[58] Field of Search ........... 426/149, 312, 370, 506, 426/519, 518, 382, 371

[56] References Cited
UNITED STATES PATENTS

| | | | |
|---|---|---|---|
| 2,622,027 | 12/1952 | Torr................................... | 426/518 |
| 2,622,028 | 12/1952 | Torr............................... | 426/518 X |

OTHER PUBLICATIONS

M. B. Jacobs, "The Chemistry and Technology of Food and Food Products," Vol. II, Interscience Publishers Inc. 1951, p. 969.

R. Seiden et al., "The Handbook of Feedstuffs," Springer Publishing Co., Inc., New York, 1957, p. 282.

"Perry's Chemical Engineer's Handbook," McGraw Hill Book Co., Fourth Edition, p. 8–17.

*Primary Examiner*—Raymond N. Jones
*Assistant Examiner*—R. A. Yoncoskie
*Attorney, Agent, or Firm*—Cooper, Dunham, Clark, Griffin & Moran

[57] ABSTRACT

Homogenized whole, fresh, green bone, cooked or uncooked, or animal or fish or shellfish calcareous material, useful as a mineral and protein food supplement suitable for animal and human consumption is prepared by supplying such material in particle form and containing the normal inorganic and organic constituents thereof to a pan, the surface of the pan moving relative to a heavy rotatable wheel positioned above or on the surface of said pan, e.g. a pan crusher, the particle form material being supplied to said pan so as to come under said wheel as it moves relative to the surface of said pan to crush the particle form material between the wheel and the surface of the pan to a particle size below about 10–50 microns, more or less, and recovering the resulting crushed material.

14 Claims, No Drawings

METHOD OF PREPARING A HOMOGENIZES FOOD PRODUCT USEFUL AS A PROTEIN SUPPLEMENT

This invention relates to a food product useful as a mineral and protein food supplement suitable for animal or human consumption. More particularly, this invention relates to the treatment of animal bones for the production therefrom of a useful food product.

In one method for the production of an animal bone food product, the bone, after having been broken and reduced to a small particle size, is subjected to an intense size reduction or disintegration operation such that the particle size of the bone is reduced to a size below about 10 microns. The technique employed in this final size reduction or disintegration operation wherein the animal bone is reduced to a particle size of less than about 10 microns resulted in the heating of the bone. This is a disadvantage particularly when it is desirable to carry out the final size reduction operation at a low temperature, e.g. about 40°F., or at the ambient temperature of a slaughterhouse or fresh meat processing plant.

Additionally, in this intense final size reduction or disintegration operation it is necessary to maintain continuous and careful control because the interior parts of the mill or disintegrator used in the final size reduction operation tend to wear away. This wearing away resulted in constant attention being paid to maintaining the desired setting or clearance within the interior of the disintegrator to insure that there was constantly produced a product having a particle size below 10 microns. A particle size substantially above 50 microns tends to give a "gritty" taste or feel and would be distinctly undesirable. Further, because of the intensity of the size reduction or disintegration operation the interior parts of the size reduction unit, even the interior parts made of Carborundum, tended to wear away and contaminate the resulting homogenized bone product. The wearing away of the lining material of the size reduction unit also tended to make the resulting homogenized bone product gritty. Further, as mentioned hereinabove, because of the heat generated during the intense disintegration operation, cooling of the size reduction unit was usually required, if not, the resulting homogenized bone product was adversely affected.

It is an object of this invention to provide an improved process for the production of an homogenized bone or other animal, fish or shellfish calcareous product useful as a mineral and protein food supplement for animal and human consumption.

It is another object of this invention to provide an improved homogenized bone product.

It is still another object of this invention to provide a process for the production of an homogenized whole bone food product wherein the product is capable of being produced at ambient or a relatively low temperature, such as a temperature in the range 35°-45°F., and of uniform composition and improved quality.

How these and other objects of this invention are achieved will become apparent in the light of the accompanying disclosure. In at least one embodiment of the practice of this invention at least one of the foregoing objects will be achieved.

It has been found that in accordance with this invention an improved homogenized bone or other animal, fish or shellfish calcareous product useful as a protein and mineral supplement suitable for animal and human comsumption is prepared by supplying particle form whole, fresh, green, cooked or uncooked, bone or other animal or fish or shellfish calcareous material, the material containing the normal or usual inorganic and organic constituents thereof, to a pan, the surface of the pan moving relative to a heavy rotatable wheel positioned above the surface of said pan. The finely divided material is supplied to the pan so as to come under the wheel as it moves relative to the surface of the pan to crush the material to a particle size below about 10 microns, more or less. At the end of the crushing operation or from time to time or continuously during the crushing operation there is recovered the resulting crushed material as said homogenized food product.

As the crusher for the production of the homogenized product in accordance with this invention having a particle size below about 10-50 microns, such as a particle size in the range 1-10 microns, or less, it is preferred to employ a heavy-duty pan crusher consisting of one or more rotatable heavy grinding wheels or mullers revolving in a pan. The pan may remain stationary and the wheels or mullers driven or the pan may be driven while the mullers or wheels revolve or rotate by friction. In both instances, however, the wheels or mullers are in frictional contact with the surface of the pan and the material added thereto. The mullers or wheels may be made of stone or any suitable metal, but preferably in the practice of this invention are made of iron provided with steel tires, preferably stainless steel tires. Scrapers, such as iron or stainless steel scrapers or plows, are provided and positioned at a proper angle so as to feed the bone material under the wheels or mullers to be crushed.

In pan crushers of the type employed in accordance with the practice of this invention the clearance between the mullers and the surface of the pan can be regulated. The pan crusher described herein has been found in accordance with this invention to be especially useful for the crushing and disintegration of finely divided whole bone. The crushing operation is very complete and results in a very fine crushed or homogenized product. As the pan rotates relative to the rotating mullers or wheels which rotate on a horizontal axis relative to the pan surface, the mullers or wheels also tend to move about the pan in a circular fashion. The resulting relative motion between the mullers and the pan surface produces a shearing and compressing of the particles between the pan surface and the mullers during the crushing operation with the result that very fine particles are produced and the particles supplied to the crusher are completely disintegrated. A pan crusher useful in the practice of this invention is illustrated and described in the *Chemical Engineers Handbook*, 3rd Ed., published by McGraw-Hill, New York, N.Y. (1950), pages 1122-1127. The above-referred disclosures of this publication are herein incorporated and made part of this disclosure.

It has been known for a long time that bone and bone products and similar animal, poultry, fish and shellfish calcareous products are rich nutritional sources. Ground bone meal has been available for many years for a number of purposes, e.g. as a dietary supplement for man and animal. Ground bone meal, however, has not been exploited as a food supplement because it is gritty and substantially tasteless. Bone meal is the end product of the rendering of fats and the high temperature extraction of gelatin from bone. Another major disadvantage of ground bone meal available heretofore is the fact that a high percentage of the ground bone meal is indigestible due to its large particle size.

Homogenized bone and the other calcareous materials, however, prepared in accordance with this invention has been found to be a palatable and readily digestible and rich source of protein and minerals, particularly calcium and phosphorus, and essential amino acids. For example, the homogenized bone prepared in accordance with this invention can be employed to replace up to one third of the total composition of frankfurters, bolognas, liverwurst, potted meats, meat loaves and other processed meat products. The resulting product is difficult, if not impossible, to distinguish from those made entirely from the usual meat components. The texture and palatability of these products are excellent in all respects. Nutritionally the protein value of foods prepared with the homogenized bone in accordance with this invention is retained and in addition valuable calcium, phosphorus, iron, bone marrow materials and trace minerals are added. In fact, the nutritional value of such food products is enhanced.

Homogenized bone prepared in accordance with this invention is a whole bone product. In the preparation of the homogenized bone, as in the preparation of other food products in accordance with this invention derived from other animal (including poultry), fish and shellfish calcareous sources, whole fresh bones are employed, preferably directly from the cutting tables and with whatever meat and connective tissue still adheres to the bone after trimming. Upon being crushed in accordance with the practices of this invention there is produced a homogenized bone food product which is creamy in physical appearance, highly palatable, rich in proteins and minerals and ready, as indicated hereinabove, for incorporation into many different types of food.

Set forth in the table hereinbelow is an analysis of a sample of homogenized bone showing the approximate composition of the major constituents thereof.

|  | By Wt. |
| --- | --- |
| Water | 50.00% |
| Protein | 17.77% |
| Fat | 13.34% |
| Calcium | 15.23% |
| Phosphorus | 7.91% |
| Salt | 1.65% |
| Iron | 0.02% |
| Undetermined Ash | 2.01% |

In comparison fresh meat has the approximate composition 70% by weight water, 19% by weight protein, 10% by weight fat and 1% by weight ash.

Specific uses of the homogenized bone, or other food products of this invention, in addition to replacing up to one-third of the usual constituents of sausages, frankfurters, prepared meat loaves, etc., include its incorporation in breakfast cereals and baby food, in flour and bakery products which are usefully enriched by the homogenized bone food product, animal foods, particularly dog and cat foods, canned and dehydrated, as well as specialty food products including meat paste and spread snacks and canned and dehydrated soups.

In the crushing operation wherein broken divided whole calcareous material is supplied to the pan crusher, desirably the crushing operation is carried out at the ambient temperature of fresh fish, poultry, shellfish or meat processing or slaughterhouse plants, such as a temperature in the range from about 35°F. to about 40°–45°F. If desired, the crushing operation may be carried out under conditions wherein the material being crushed is exposed to the ambient atmosphere or under a controlled or inert atmosphere, such as may be provided by carbon dioxide and/or nitrogen and/or steam. In some instances it may be desirable to carry out the crushing operation at an elevated temperature, such as a temperature in the range from about 150°F. to about 212°F., preferably in the presence of steam which is usefully or conveniently employed to maintain the crushing operation at the aforementioned elevated temperature.

Because of the nature of the crushing operation, in the sense that the material being processed and crushed during the crushing operation does not tend to heat upon increase in temperature, the material is essentially processed at ambient temperature or at the same temperature the bone is supplied to the crushing operation. This aspect of the practice of the invention distinguishes over and provides an advantage over processes known heretofore, wherein the final comminution or size reduction operation was so intense the resulting comminuted bone was heated to undesirably high temperatures and necessitated cooling of the crushing operation to avoid undesirably high temperatures. By employing a pan crusher in accordance with the practices of this invention freshly cut whole bone or other calcareous material, or mixtures thereof, mentioned herein, after any desirable preliminary size reduction or breaking operation, is processed or crushed at its ambient temperature in the crusher to the final homogenized food product without any temperature rise due to the crushing operation and without the undesirable inclusion of finely divided particles derived from the crushing and grinding equipment by attrition during use.

The crushed homogenized food, especially the animal bone product, can be processed directly to a form suitable for animal or human consumption or can be incorporated with other food products and further processed, such as by cooking and canning, for subsequent consumption.

As indicated hereinabove, besides animal bone, such as beef, pork, lamb (sheep), horse and the like, other calcareous material such as poultry bone (chicken, turkey, duck and the like) and fish bone and shells and calcareous components of shellfish, e.g. lobster, shrimp and crab, all cooked (even pressure cooked) or uncooked are usually employed in the production of the homogenized food products of this invention.

As indicated hereinabove, the bone or other calcareous material may be pre-cooked before crushing and grinding, such as having been cooked at a temperature in the range about 150°–300°F., more or less, such as in a steam retort, and employing corresponding steam pressures, e.g. up to about 300 psig, more or less.

Also, in accordance with a special embodiment of this invention the resulting crushed and ground bone or calcareous material may be dehydrated or partially dehydrated and employed as food suitable for human and for animal consumption or, if desired, as fertilizer.

As will be apparent to those skilled in the art in the light of the foregoing disclosure, many modifications, alterations and substitutions are possible in the practice

I claim:

1. A method of preparing a food product useful as a protein and mineral food supplement suitable for animal and human consumption which comprises supplying particle-form animal bone or other animal, fish or shellfish calcareous material to the surface of a pan, the surface of said pan moving relative to a heavy rotatable wheel positioned closely above or on the surface of said pan, the particle-form material being supplied to the surface of said pan so as to come under said wheel as it moves relative to the surface of said pan to crush the particle-form material to a particle size below about 50 microns and recovering the resulting crushed material as said food product.

2. A method in accordance with claim 1 wherein the said food product is prepared from beef bone.

3. A method in accordance with claim 1 wherein the said food product is prepared from pork bone.

4. A method in accordance with claim 1 wherein the said food product is prepared from sheep or lamb bone.

5. A method in accordance with claim 1 wherein the said food product is prepared from poultry bone.

6. A method in accordance with claim 1 wherein the said food product is prepared from fish bone.

7. A method in accordance with claim 1 wherein the said food product is prepared from the calcareous portion of shellfish.

8. A method in accordance with claim 7 wherein the said shellfish is selected from shrimp, lobster and crab.

9. A method in accordance with claim 1 wherein the said food product is prepared by crushing the particle form material at ambient temperature.

10. A method in accordance with claim 1 wherein the said food product is prepared by crushing the particle form material in an inert atmosphere made up of a gas selected from the group consisting of carbon dioxide and nitrogen.

11. A method in accordance with claim 1 wherein said particle form material is crushed in contact with steam at substantially atmospheric pressure.

12. A method in accordance with claim 11 wherein said particle form material is crushed in contact with steam at atmospheric pressure and at a temperature within a range of 150°F. to about 212°F.

13. A method in accordance with claim 1 wherein the crushing of said particle form material is carried out such that the temperature of the resulting homogenized food product is substantially the same as the temperature of the particle form material supplied to said pan.

14. A method of preparing a food product useful as a mineral and protein food supplement suitable for animal and human consumption which comprises breaking animal bone containing the normal inorganic and organic constituents thereof to a size of about 1 inch, further reducing the size of the resulting broken animal bone to a size of about ⅛ inch, thereupon reducing the bone to a particle size of about 200–300 microns, supplying the thus-treated animal bone to a pan, the surface of said pan moving relative to a heavy rotatable wheel positioned above said pan surface, the thus-treated bone being supplied to said pan so as to come under said wheel as it moves relative to the surface of said pan to crush the bone to a particle size below about 10 microns and recovering the resulting crushed bone as said food product.

* * * * *

UNITED STATES PATENT OFFICE
CERTIFICATE OF CORRECTION

Patent No. 3,873,750                    Dated   March 25, 1975

Inventor(s)   David Torr

It is certified that error appears in the above-identified patent and that said Letters Patent are hereby corrected as shown below:

On the Title page and Column 1, the title should correctly read -- METHOD OF PREPARING A HOMOGENIZED FOOD PRODUCT USEFUL AS A PROTEIN SUPPLEMENT --

Signed and sealed this 1st day of July 1975.

(SEAL)
Attest:

RUTH C. MASON
Attesting Officer

C. MARSHALL DANN
Commissioner of Patents
and Trademarks